United States Patent
Ueda et al.

(10) Patent No.: US 8,245,525 B2
(45) Date of Patent: Aug. 21, 2012

(54) HEAT SOURCE APPARATUS, HEAT SOURCE SYSTEM, AND METHOD FOR OPERATING HEAT SOURCE APPARATUS

(75) Inventors: Kenji Ueda, Aichi (JP); Minoru Matsuo, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 695 days.

(21) Appl. No.: 12/446,915

(22) PCT Filed: Oct. 30, 2007

(86) PCT No.: PCT/JP2007/071084
§ 371 (c)(1),
(2), (4) Date: Apr. 23, 2009

(87) PCT Pub. No.: WO2008/053872
PCT Pub. Date: May 8, 2008

(65) Prior Publication Data
US 2010/0031683 A1    Feb. 11, 2010

(30) Foreign Application Priority Data
Oct. 30, 2006  (JP) ................................. 2006-294410

(51) Int. Cl.
*F25B 49/00*     (2006.01)
*H02H 5/00*     (2006.01)
*H02H 7/00*     (2006.01)
(52) U.S. Cl. ................. 62/230; 361/22; 361/24; 361/31
(58) Field of Classification Search ................. 62/228.1, 62/230; 417/14, 292; 361/22, 24, 31
See application file for complete search history.

(56) References Cited

U.S. PATENT DOCUMENTS

| | | | | | |
|---|---|---|---|---|---|
| 4,736,595 | A | * | 4/1988 | Kato | 62/160 |
| 5,209,075 | A | * | 5/1993 | Kim | 62/126 |
| 6,351,960 | B1 | * | 3/2002 | Shin | 62/229 |
| 7,134,295 | B2 | * | 11/2006 | Maekawa | 62/228.1 |

FOREIGN PATENT DOCUMENTS
JP         7-83487 A          3/1995
(Continued)

OTHER PUBLICATIONS

Notification of Transmittal of Translation of the International Preliminary Report on Patentability (Form PCT/IB/338) of International Application No. PCT/JP2007/071084 mailed Jun. 4, 2009 with Forms PCT/IB/373 and PCT/ISA/237.

(Continued)

*Primary Examiner* — Marc Norman
(74) *Attorney, Agent, or Firm* — Westerman, Hattori, Daniels & Adrian, LLP (57) ABSTRACT

A heat source apparatus in which a control device of the heat source apparatus can ascertain a stoppage of an inverter device and in which a stable operating time of the heat source apparatus can be extended is provided. The heat source apparatus includes an electric compressor that is driven by an inverter device and that compresses a refrigerant, the inverter device having a protective function that performs stoppage for device protection on the basis of a predetermined calculation by an inverter control portion, and a control device that controls cold output and/or heat output. The control device includes an inverter-protective-function estimating unit that estimates a calculation result of the protective function of the inverter control portion.

15 Claims, 4 Drawing Sheets

FOREIGN PATENT DOCUMENTS

| | | | |
|---|---|---|---|
| JP | 9-273799 | A | 10/1997 |
| JP | 11-103523 | A | 4/1999 |
| JP | 11-215888 | A | 8/1999 |
| JP | 2003-34132 | A | 2/2003 |
| JP | 2003-143871 | A | 5/2003 |
| JP | 2004-32906 | A | 1/2004 |
| JP | 2004-173347 | A | 6/2004 |
| JP | 2005-345101 | A | 12/2005 |

OTHER PUBLICATIONS

International Search Report of PCT/JP2007/071084, date of mailing Jan. 29, 2008.

Japanese Office Action dated May 31, 2011, issued in corresponding Japanese Patent Application No. 2006-294410.

* cited by examiner

HEAT SOURCE APPARATUS, HEAT SOURCE SYSTEM, AND METHOD FOR OPERATING HEAT SOURCE APPARATUS

TECHNICAL FIELD

The present invention relates to a heat source apparatus equipped with an electric compressor that is driven by an inverter device, to a heat source system, and to a method for operating a heat source apparatus.

BACKGROUND ART

As a chiller or a heat-pump chiller that requires an ability to handle a relatively large capacity, such as for chilled-water supply in a semiconductor manufacturing plant or local heating and cooling, a turbo chiller (heat source apparatus) that compresses a refrigerant by using a turbo compressor is widely used. A turbo compressor in such a turbo chiller is generally electrically driven by an electric motor, and a known type of electric turbo compressor with an arbitrarily variable rotation speed is equipped with an inverter device.

An inverter device used in such an electric turbo compressor with a variable rotation speed is equipped with a power device, such as an insulated gate bipolar transistor (referred to as "IGBT" hereinafter), and a large current flows into the power device in accordance with the torque required by the electric motor.

To protect the power device in the case where an excessive current flows therein, the inverter device is provided with an overcurrent protective function that stops the inverter device when an overcurrent flows therein, as described in Patent Document 1. This overcurrent protection is performed by an inverter control portion, such as a microcomputer, provided in the inverter device, which is independent of a control device of an air conditioning apparatus.

Patent Document 1:
Japanese Unexamined Patent Application, Publication No. 2004-32906 (Paragraphs [0018] to [0020] and [0032] to [0045], and FIGS. 1 and 3)

DISCLOSURE OF INVENTION

As stopping conditions (trip conditions) provided in the inverter device, overload protection in which the temperature inside the power device, such as an IGBT, is calculated from an output current and the temperature in the vicinity of the power device, and electronic thermal motor protection that protects the electric motor by using an output current are provided in addition to the overcurrent protection described in Patent Document 1.

The overload protective function and the electronic thermal function are calculated by the inverter control portion of the inverter device, and the inverter device is stopped independently of the chiller on the basis of determination made by the inverter control portion. Since the electric compressor stops operating when the inverter device stops, the chiller also stops accordingly.

The stoppage of the inverter device in this manner regardless of the operating condition of the chiller can be disadvantageous to a demander who demands cold output or heat output. From the viewpoint of the control device of the chiller, this stoppage is unexpected, sudden, and not ascertained by the control device of the chiller and therefore prevents the stopping operation from being performed according to a predetermined sequence, which is undesirable. This can possibly cause problems in the individual devices of the chiller.

In view of the circumstances described above, it is an object of the present invention to provide a heat source apparatus, a heat source system, and a method for operating a heat source apparatus in which the control device of the heat source apparatus can ascertain a stoppage (trip state) of the inverter device and in which a stable operating time of the heat source apparatus can be extended.

In order to achieve the aforementioned object, a heat source apparatus, a heat source system, and a method for operating a heat source apparatus according to the present invention employ the following solutions.

Specifically, a heat source apparatus according to the present invention includes an electric compressor that is driven by an inverter device and that compresses a refrigerant, the inverter device having a protective function that performs stoppage for device protection on the basis of a predetermined calculation by an inverter control portion; a condenser that condenses the refrigerant compressed by the electric compressor; an expansion valve that expands the refrigerant condensed by the condenser; an evaporator that evaporates the refrigerant expanded by the expansion valve; and a control device that controls cold output and/or heat output. The control device includes an inverter-protective-function estimating unit that estimates a calculation result of the protective function of the inverter control portion.

The calculation result obtained by the protective function of the inverter control portion is estimated at the inverter-protective-function estimating unit provided in the heat source apparatus, whereby a stoppage by the protective function of the inverter device can be predicted. Accordingly, the inverter device can be stopped on the basis of the inverter control portion's own determination regardless of the condition of the heat source apparatus ascertained by the control device of the heat source apparatus. In consequence, the control device of the heat source apparatus can avoid unexpected stoppages.

The heat source apparatus may be, for example, a turbo chiller or a screw chiller.

Furthermore, in the heat source apparatus of the present invention, when the inverter-protective-function estimating unit determines that a stopping operation by the protective function of the inverter control portion is imminent, the control device may perform control so as to reduce a load on the inverter device.

For example, when a condition where an output current from the inverter device is greater than a rated value continues, a stopping operation by the protective function of the inverter control portion is imminent. If the operation of the heat source apparatus continues, the inverter control portion performs a stopping operation, which is undesirable. Therefore, when the inverter-protective-function estimating unit provided in the control device of the heat source apparatus determines that a stopping operation by the inverter control portion is imminent, a control operation is performed to reduce the load on the inverter device so as to delay the timing of the stopping operation.

Furthermore, the heat source apparatus of the present invention may be configured such that the load on the inverter device is reduced by performing capacity control of the heat source apparatus.

By performing capacity control of the heat source apparatus, a load applied to the electric compressor of the heat source apparatus can be reduced, whereby the load on the inverter device is reduced accordingly. A method for load reduction by capacity control includes limiting the degree of opening of an inlet vane that adjusts the refrigerant intake of the electric compressor to a predetermined value or lower, reducing the rotation speed of the electric compressor, and opening a hot-gas bypass valve that provides a bypass between the refrigerant discharge side and the refrigerant intake side of the electric compressor.

Furthermore, in the heat source apparatus of the present invention, an inverter stopping condition may be determined to occur when an integrated value of the predetermined calculation by the protective function of the inverter control portion reaches an upper limit, where the predetermined calculation may include addition when an output current output from the inverter device to the electric compressor exceeds a polarity-determining value and subtraction when the output current falls below the polarity-determining value. The inverter-protective-function estimating unit may obtain the output current value and the polarity-determining value from the inverter device to perform the addition and the subtraction.

In order to protect an electric motor driven by the inverter device or a power device, such as an IGBT, contained in the inverter device, a so-called electronic thermal function that estimates the temperature inside the power device from an output current and the temperature in the vicinity of the power device is provided. In this electronic thermal function, an output current value is provided with a polarity-determining value, and a calculation is performed such that at 105% of a rated current or higher, an addition process is performed, whereas below 105% of the rated current, a subtraction process is performed. An inverter stopping condition is determined to occur when the integrated value of this calculation reaches the upper limit. By obtaining the output current value and the polarity-determining value from the inverter device, this integrated value can be estimated by the inverter-protective-function estimating unit provided in the control device of the heat source apparatus. Accordingly, unexpected stoppages of the heat source apparatus can be avoided.

Furthermore, in the heat source apparatus of the present invention, the inverter-protective-function estimating unit may have a load limit threshold with which the load on the inverter device is limited by controlling the heat source apparatus using the control device before the integrated value reaches a corresponding upper limit that corresponds to the upper limit of the inverter device.

When the polarity-determining value is exceeded, a stopping operation is imminent. In the present invention, the load limit threshold is provided before the integrated value reaches the corresponding upper limit. When this load limit threshold is exceeded, the heat source apparatus is controlled so as to limit the load on the inverter device. Accordingly, the timing of the stopping operation of the inverter device can be delayed without increasing the load on the inverter device.

A method for controlling the heat source apparatus for limiting the load on the inverter device includes, for example, limiting the degree of opening of an inlet vane that adjusts the refrigerant intake of the electric compressor, limiting the degree of opening of a hot-gas bypass valve provided in a bypass channel that takes out a portion of the refrigerant discharged from the electric compressor and provides a bypass connection between the condenser and the evaporator to allow the refrigerant to make a detour toward the intake side of the electric compressor, and limiting the rotation speed of the electric compressor.

Furthermore, in the heat source apparatus of the present invention, the inverter-protective-function estimating unit may have a forced limit value with which a performance of the heat source apparatus is forcedly reduced, the forced limit value being between the load limit threshold and the corresponding upper limit.

When the load limit threshold is exceeded, and moreover, the corresponding upper limit is approached such that the forced limit value is exceeded, the performance of the heat source apparatus is forcedly reduced so as to forcedly reduce the load on the inverter device. Accordingly, the stopping timing of the inverter device can be delayed.

Furthermore, in the heat source apparatus of the present invention, the corresponding upper limit may be a value that is smaller than the upper limit of the inverter device, and a stopping operation of the heat source apparatus may be performed when the corresponding upper limit is reached.

With the corresponding upper limit set smaller than the upper limit of the inverter device, the corresponding upper limit according to the calculation of the control device of the heat source apparatus would be reached prior to the upper limit according to the calculation of the inverter control portion. This means that a stopping operation of the heat source apparatus would be performed prior to a stopping operation of the inverter device, thereby achieving a stable stopping operation according to a predetermined sequence at the heat source apparatus side.

Furthermore, in the heat source apparatus of the present invention, when an output current value of the inverter device that drives the electric compressor exceeds a first threshold, the control device may control the heat source apparatus so as to limit a load on the inverter device.

When the output current value of the inverter device exceeds the first threshold, a control operation is performed to limit the performance of the heat source apparatus so as to limit the load on the inverter device. Specifically, the control device limits the degree of opening of an inlet vane that adjusts the refrigerant intake of the electric compressor, limits the degree of opening of a hot-gas bypass valve provided in a bypass channel that allows a portion of the refrigerant discharged from the electric compressor to make a detour toward the intake side of the electric compressor, and/or limits the rotation speed of the electric compressor. In this manner, limitation based on the output current value is performed together with the limitation based on the integrated value performed in the control device of the heat source apparatus, whereby stable operation of the heat source apparatus can be further extended.

Furthermore, in the heat source apparatus of the present invention, when the output current value exceeds a second threshold that is greater than the first threshold, the control device may forcedly reduce a performance of the heat source apparatus.

When the output current value further exceeds the second threshold after exceeding the first threshold, a stopping operation of the inverter device is even more imminent. When the second threshold is exceeded, the performance of the heat source apparatus is forcedly reduced so as to reduce the load on the inverter device. A method for forcedly reducing the performance of the heat source apparatus includes forcedly closing the opening of the inlet vane, forcedly opening the opening of the hot-gas bypass valve, and/or forcedly setting the rotation speed to a minimum rotation speed. In this manner, limitation based on the output current value is performed together with the limitation based on the integrated value performed in the control device of the heat source apparatus, whereby stable operation can be further extended.

Furthermore, in the heat source apparatus of the present invention, the inverter-protective-function estimating unit may obtain the calculation result of the protective function from the inverter control portion.

By obtaining the calculation result of the protective function from the inverter control portion, the estimation in the control device of the heat source apparatus can be omitted.

A heat source system of the present invention includes the aforementioned inverter device that drives the aforementioned electric compressor, and a plurality of any of the aforementioned heat source apparatuses. Specifically, the heat source system of the present invention includes an inverter device having a protective function that performs stoppage for device protection on the basis of a predetermined calculation by an inverter control portion; and a plurality of heat source apparatuses. Each heat source apparatus includes an electric compressor that is driven by the inverter device and that compresses a refrigerant, a condenser that condenses the refrigerant compressed by the electric compressor, an expansion valve that expands the refrigerant condensed by the condenser, an evaporator that evaporates the refrigerant expanded by the expansion valve, and a control device that controls cold output and/or heat output. The control device includes an inverter-protective-function estimating unit that estimates a calculation result of the protective function of the inverter control portion.

Generally, in a heat source system equipped with a plurality of heat source apparatuses, the system shifts from the single-apparatus operation to the multiple-apparatus operation as the load increases. In this case, since a pre-activated heat source apparatus requires a large load, the inverter device tends to become overloaded. In that case, the protective function of the inverter device can be ascertained by the heat source apparatus, whereby the stable operating time can be extended.

In a method for operating a heat source apparatus of the present invention in which the heat source apparatus includes an electric compressor that is driven by an inverter device and that compresses a refrigerant, the inverter device having a protective function that performs stoppage for device protection on the basis of a predetermined calculation by an inverter control portion, a condenser that condenses the refrigerant compressed by the electric compressor, an expansion valve that expands the refrigerant condensed by the condenser, an evaporator that evaporates the refrigerant expanded by the expansion valve, and a control device that controls cold output and/or heat output, the method includes estimating a calculation result of the protective function of the inverter control portion by using the control device.

The calculation result obtained by the protective function of the inverter control portion is estimated by the control device provided in the heat source apparatus, whereby a stoppage by the protective function of the inverter device can be predicted. Therefore, according to the method for operating the heat source apparatus of the present invention, the inverter device can be stopped on the basis of the inverter control portion's own determination regardless of the condition of the heat source apparatus ascertained by the control device of the heat source apparatus. In consequence, the control device of the heat source apparatus can avoid unexpected stoppages.

According to the present invention, since the calculation result of the protective function of the inverter control portion is estimated at the heat source apparatus side, a stoppage (trip state) of the inverter device can be ascertained by the control device of the heat source apparatus, and a stable operating time of the heat source apparatus can be extended.

EXPLANATION OF REFERENCE SIGNS

1: turbo chiller (heat source apparatus)
1a: control device
3: inverter device
3a: inverter control portion
5: turbo compressor (electric compressor)
7: electric motor
8: evaporator
13: condenser
14: hot-gas bypass valve
35: inlet vane
S: integrated value
St: load limit threshold
Scr: forced limit value
Ssd: corresponding upper limit

BEST MODE FOR CARRYING OUT THE INVENTION

An embodiment according to the present invention will be described below with reference to the drawings.

Figure 1:
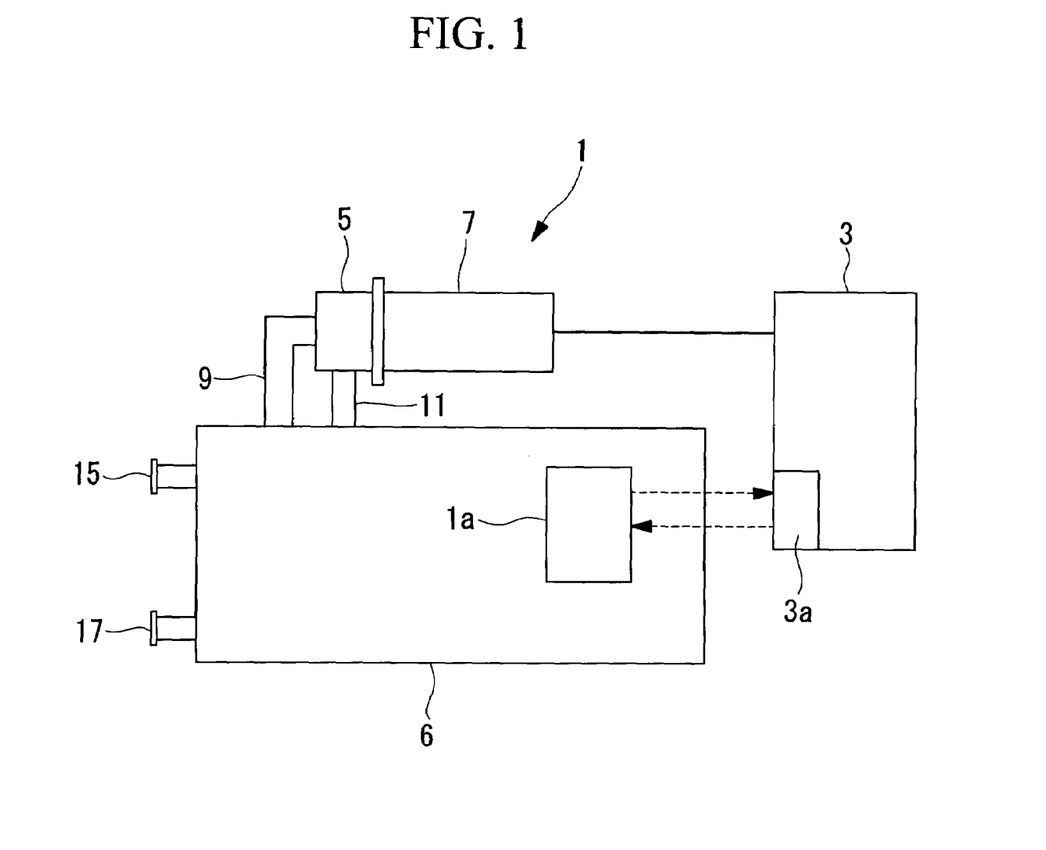
FIG. 1 is a schematic configuration diagram illustrating a heat-pump turbo chiller according to an embodiment of the present invention.

FIG. 1 illustrates a schematic configuration of a turbo chiller (heat source apparatus) 1 of the present invention.

As shown in FIG. 1, the turbo chiller 1 includes a turbo compressor 5 that compresses a refrigerant, a main body 6 containing a condenser, an evaporator, and an expansion valve to be described later, and a control device 1a that controls the operation of the turbo chiller 1.

The turbo compressor 5 is of an electrically driven type that is rotationally driven by an electric motor 7. The electric motor 7 is electrically connected to an inverter device 3 and can be operated at variable speeds by means of this inverter device 3.

The inverter device 3 is provided with an inverter control portion 3a. The inverter control portion 3a communicates with the control device 1a of the turbo chiller 1 and controls the rotation speed of the electric motor 7 on the basis of an instruction from the control device 1a. The control device 1a has various kinds of protective functions, e.g. overload protection in which the temperature inside a power device, such as an IGBT, is calculated from an output current and the temperature in the vicinity of the power device, and electronic-thermal motor protection that protects an electric motor by using an output current.

Discharge refrigerant compressed by the turbo compressor 5 is sent to the condenser in the main body 6 through a discharge pipe 9. On the other hand, intake refrigerant taken into the turbo compressor 5 flows into the evaporator through an intake pipe 11.

The main body 6 is connected to chilled-water pipes 15 and 17 that supply chilled water to the external load. The supply chilled-water pipe 17 is for supplying chilled water towards the load, and the return chilled-water pipe 15 is for returning the chilled water, after being used in the external load, to the main body 6.

Figure 2:
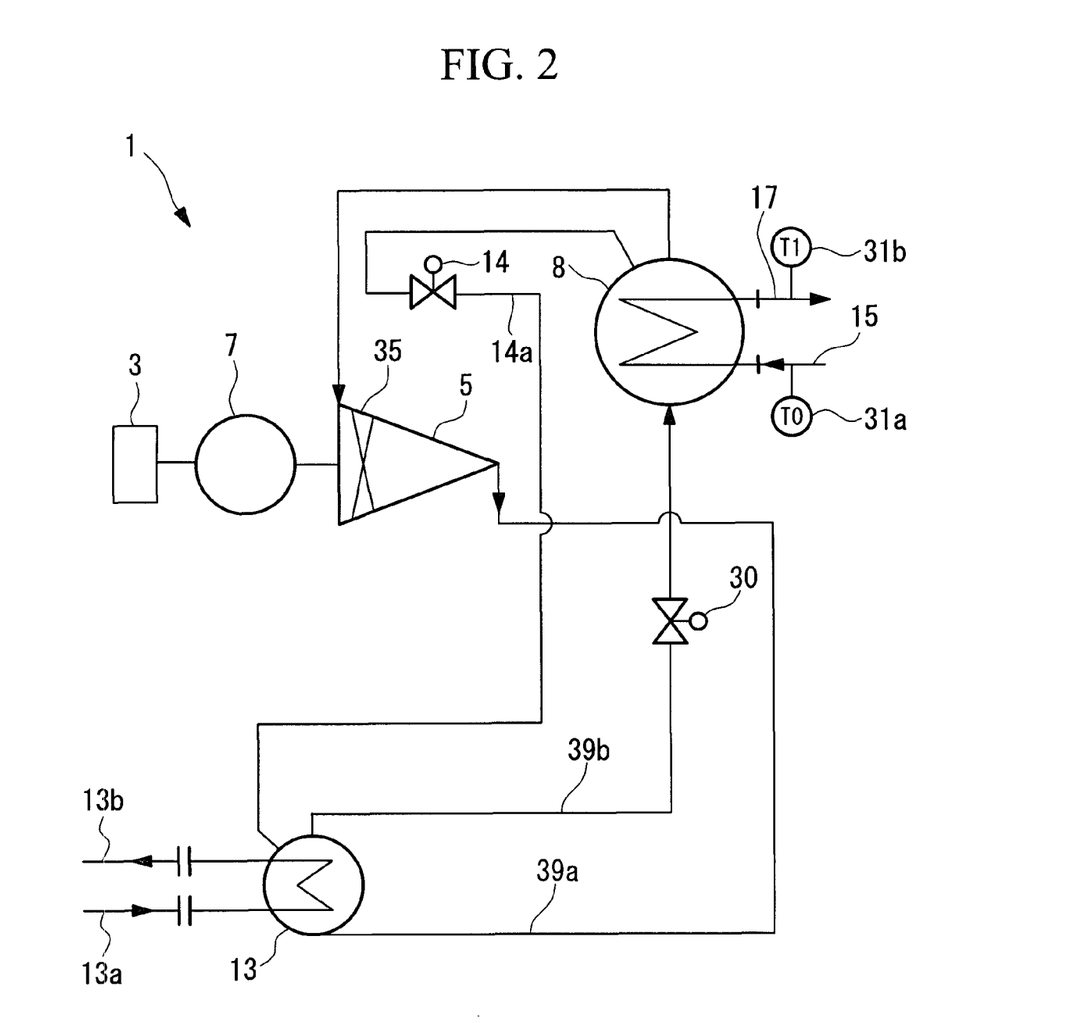
FIG. 2 is a refrigerant circuit configuration diagram of the turbo chiller in FIG. 1.

FIG. 2 illustrates a refrigerant circuit configuration of the turbo chiller 1 shown in FIG. 1.

In the drawing, a condenser 13 connected to cooling water pipes 13a and 13b, an evaporator 8 connected to the chilled-water pipes 15 and 17, and an expansion valve 30 provided between the condenser 13 and the evaporator 8 are provided.

The refrigerant intake side of the turbo compressor 5 is provided with an inlet vane 35. The inlet vane 35 adjusts the flow rate of refrigerant flowing into the turbo compressor 5. The degree of opening of the inlet vane 35 is controlled by the control device 1a (see FIG. 1). With this adjustment of the degree of opening of the inlet vane 35, an output chilled-water temperature T1 is controlled.

The condenser 13 is a shell-and-tube heat exchanger. The condenser 13 is connected to the cooling water pipes 13a and 13b, and the water flowing through these cooling water pipes 13a and 13b and the refrigerant in the shell perform heat exchange. The cooling water pipes 13a and 13b are connected to a cooling tower (not shown).

The evaporator 8 is a shell-and-tube heat exchanger. The evaporator 8 is connected to the chilled-water pipes 15 and 17, and the water flowing through these chilled-water pipes 15 and 17 and the refrigerant in the shell perform heat exchange. As mentioned above, the chilled-water pipes 15 and 17 are connected to the external load and have chilled water flowing therethrough. An input chilled-water temperature sensor 31a that measures an input chilled-water temperature T0 before the heat exchange is provided on the upstream side of the supply chilled-water pipe 17, whereas an output chilled-water temperature sensor 31b that measures the output chilled-water temperature T1, after the chilled water being used in the external load, is provided on the downstream side of the return chilled-water pipe 15. Generally, during a cooling operation, the input chilled-water temperature T0 is set to 12° C. and the output chilled-water temperature T1 is set to 7° C.

A hot-gas bypass pipe 14a is provided between the discharge side of the turbo compressor 5 and the intake side of the turbo compressor 5. The hot-gas bypass pipe 14a is provided with a hot-gas bypass valve 14 for adjusting the flow rate of refrigerant. High-temperature high-pressure discharge refrigerant with its flow rate adjusted by the hot-gas bypass valve 14 is made to bypass towards the intake side of the turbo compressor 5.

The expansion valve 30 is provided between the condenser 13 and the evaporator 8 and is configured to throttle a liquid refrigerant so as to allow it to undergo isenthalpic expansion.

The degree of opening of the expansion valve 30 is controlled by the control device 1a (see FIG. 1).

The operation of the turbo chiller 1 having the above-described configuration will be described below.

The turbo compressor 5 is driven by the electric motor 7 and is rotated at a predetermined frequency by the inverter device 3 on the basis of an instruction from the control device 1a. The degree of opening of the inlet vane 35 is adjusted by the control device 1a such that a set temperature (e.g., an output chilled-water temperature of 7° C.) is achieved.

A portion of high-temperature high-pressure gas refrigerant discharged from the turbo compressor 5 travels through the hot-gas bypass pipe 14a, and the flow rate of the refrigerant is adjusted by the hot-gas bypass valve 14 before the refrigerant is guided to the turbo compressor 5.

Low-pressure gas refrigerant taken in from the evaporator 8 is compressed by the turbo compressor 5 so as to become high-pressure gas refrigerant. The high-pressure gas refrigerant discharged from the turbo compressor 5 travels through a refrigerant pipe 39a so as to be guided to the condenser 13.

In the condenser 13, the high-temperature high-pressure gas refrigerant is substantially isobarically cooled by a cooling water from the cooling tower (not shown) so as to become high-temperature high-pressure liquid refrigerant. The high-temperature high-pressure liquid refrigerant travels through a refrigerant pipe 39b so as to be guided to the expansion valve 30, and the expansion valve 30 causes the liquid refrigerant to undergo isenthalpic expansion. The refrigerant expanded in this manner evaporates in the evaporator 8 and takes heat away from the chilled-water pipes 15 and 17. Accordingly, the chilled water flowing in at 12° C. is sent back at 7° C. towards the external load.

The low-pressure gas refrigerant evaporated in the evaporator 8 is guided to the turbo compressor 5 where the gas refrigerant is compressed again.

An inverter-protective-function estimating unit provided in the control device 1a of the turbo chiller 1 will now be described.

Calculations related to overheat protection and an electronic thermal function, which are independently performed in the inverter control portion 3a, are performed in a parallel fashion in the inverter-protective-function estimating unit provided in the control device 1a of the turbo chiller 1.

An electronic thermal function for protecting the electric motor 7 will be described below as an example.

In the electronic thermal function, an integrated value S calculated on the basis of an output current value A of the inverter device 3 and a polarity-determining value are used. When this integrated value S reaches 100%, a trip state is determined to occur, and the inverter device 3 is stopped. The polarity-determining value becomes positive when the output current is higher than or equal to a predetermined value (e.g. 105% of a rating), and becomes negative when the output current is lower than the predetermined value.

An integrated value S is calculated as follows.

i) When the polarity-determining value is positive (i.e., when the output current value is higher than or equal to 105% of the rating), $$S(i+1)=S(i)+f(A)\times t$$

ii) When the polarity-determining value is negative (i.e., when the output current value is lower than 105% of the rating), $$S(i+1)=S(i)-g(A)\times t$$

In this case, i denotes a time series number of each calculation period, f(A) and g(A) each denote a function (%/sec) at the time of a current value A, and t denotes a calculation period (sec).

As is apparent from the above expressions, the integrated value S is subject to addition when higher than the polarity-determining value and is subject to subtraction when lower than the polarity-determining value.

Figure 3:
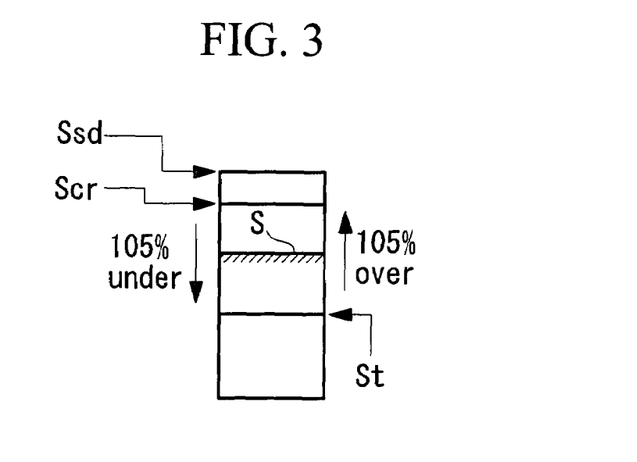
FIG. 3 is a diagram illustrating the concept of calculating an electronic thermal function in a control device 1a of a turbo chiller 1.

FIG. 3 is a diagram illustrating the concept of calculating the above-described electronic thermal function in the control device 1a of the turbo chiller 1.

As shown in the drawing, the integrated value S is subject to addition when the output current value, which is a polarity-determining value, is higher than 105%, and is subject to subtraction when the value is lower than this. The control device 1a, either in advance or via communication, obtains the polarity-determining value used by the inverter control portion 3a so as to use the same polarity-determining value as the inverter control portion 3a.

In the drawing, St denotes a load limit threshold that limits the performance of the turbo chiller 1 so as to limit the load on the inverter device 3, as described later. An example of a method for limiting the performance of the turbo chiller 1 in order to limit the load on the inverter device 3 includes limiting the degree of opening of the inlet vane 35, limiting the degree of opening of the hot-gas bypass valve 14, and limiting the rotation speed of the electric motor 7.

Scr denotes a forced limit value that forcedly limits the performance of the turbo chiller 1. For example, the performance of the turbo chiller 1 is forcedly limited by forcedly closing the inlet vane 35.

Ssd denotes a corresponding upper limit that corresponds to an upper limit of the integrated value of the inverter device 3. When the integrated value S reaches this corresponding upper limit Ssd, a stopping operation of the turbo chiller 1 is performed. The corresponding upper limit Ssd is a value smaller than an upper limit used in the electronic thermal function of the inverter control portion 3a.

Figure 4:
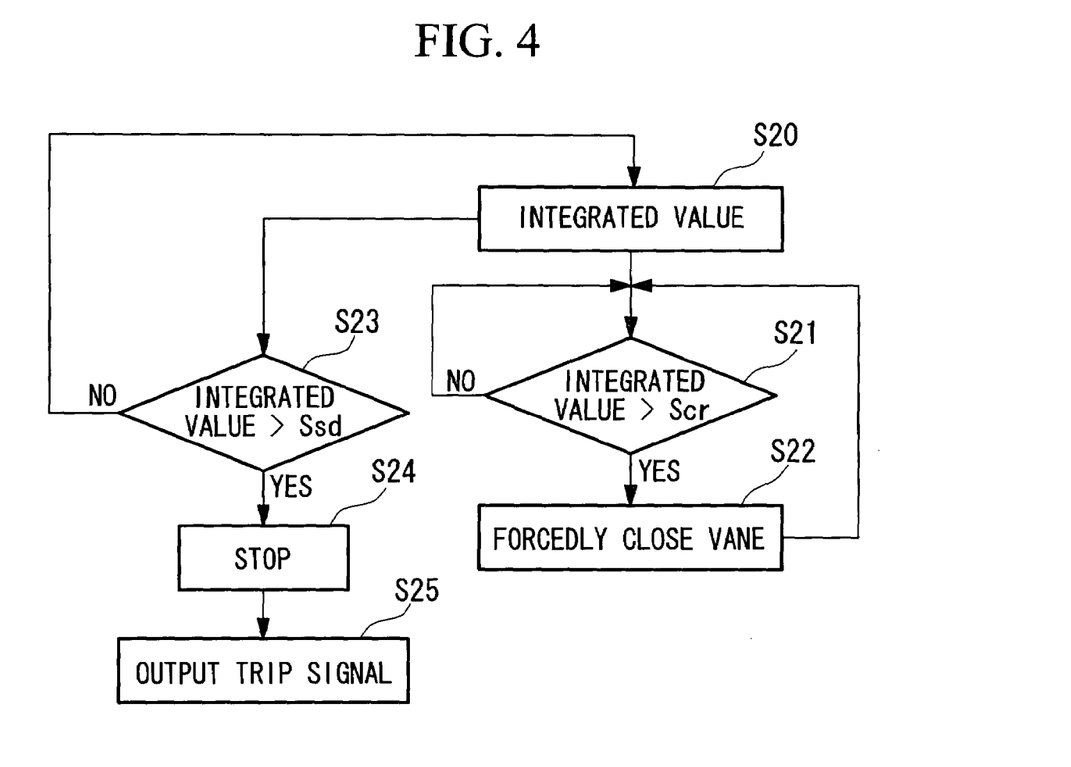
FIG. 4 is a flow chart illustrating the flow of control performed in an inverter-protective-function estimating unit of the control device of the turbo chiller.

FIG. 4 illustrates the flow of control performed in the inverter-protective-function estimating unit of the control device 1a of the turbo chiller 1.

An integrated value S is read for each control period in step S20, and it is determined whether or not the integrated value S exceeds the forced limit value Scr (step S21). If the forced limit value Scr is exceeded, the operation proceeds to step S22 where the inlet vane 35 is forcedly closed so as to forcedly limit the performance of the turbo chiller 1 to reduce the load on the inverter device 3. Thus, the addition of the integrated value S is alleviated or reduced, thereby delaying the stopping timing of the inverter device 3.

On the other hand, if the integrated value S exceeds the corresponding upper limit Ssd (step S23), the turbo chiller 1 is stopped (step S24). This stopping operation is performed according to a predetermined sequence, and this stopping sequence is set so that there is no damage in the individual devices of the turbo chiller 1. In step S25, a trip signal is output.

Figure 5:
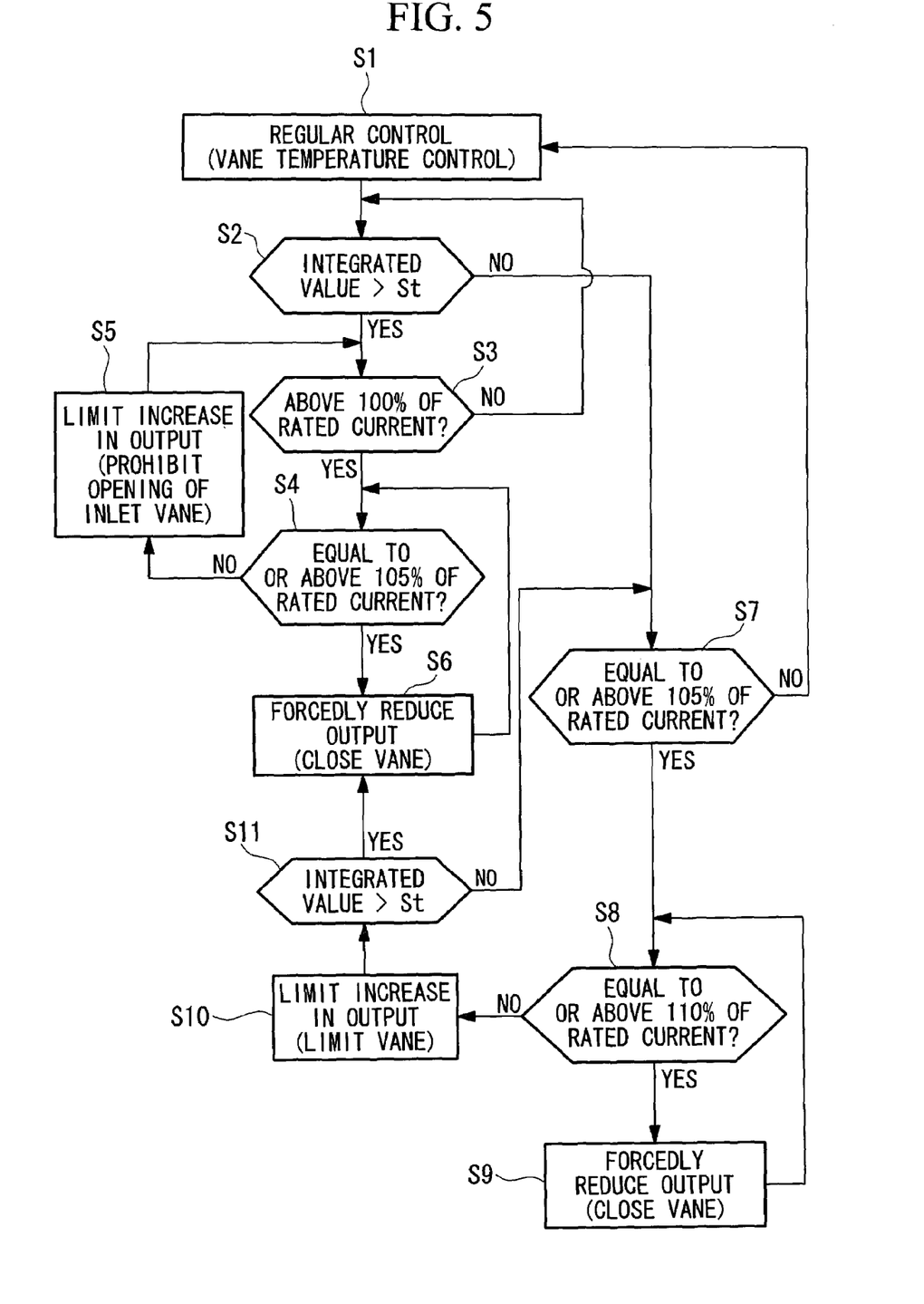
FIG. 5 is a flow chart illustrating the flow of control performed in view of an output current value of an inverter device 3.

FIG. 5 illustrates the flow of control performed in view of an output current value of the inverter device 3 in addition to the limitation based on the integrated value S.

In the case where the integrated value S calculated at the inverter-protective-function estimating unit of the control device 1a of the turbo chiller 1 falls below the load limit threshold St, a regular control operation is performed in which the degree of opening of the inlet vane 35 is controlled so as to supply chilled water at constant temperature (step S1).

If the integrated value S exceeds the load limit threshold St (step S2), it is determined in the following manner whether or not to control the inlet vane 35 to limit the load on the inverter device 3.

If the output current value from the inverter device 3 falls below 100% of a rated current (step S3), the operation returns to step S2 to monitor the integrated value without performing special control for load limitation.

If the output current value from the inverter device 3 exceeds 100% of the rated current (step S3) but falls below 105% of the rated current (step S4), the degree of opening of the inlet vane 35 is prohibited from being increased from the current state in order to limit an increase in the output (performance) of the turbo chiller 1. Accordingly, the load on the inverter device 3 is limited and therefore does not increase.

If the output current value from the inverter device 3 exceeds 100% of the rated current (step S3) and is higher than or equal to 105% of the rated current (step S4), the operation proceeds to step S6 where the inlet vane 35 is forcedly closed so as to forcedly reduce the output of the turbo chiller 1. Accordingly, the load on the inverter device 3 is prevented from increasing. Moreover, since 105% of the rated current is a polarity-determining value, if the integrated value S exceeds the load limit threshold St and is increasing, a control operation is performed to forcedly close the inlet vane 35.

On the other hand, if the integrated value S falls below the load limit threshold St in step S2, the operation proceeds to step S7 where it is determined whether or not the output current value exceeds 105% of the rated current (first threshold). If the output current value does not exceed 105% of the rated current, the operation returns to regular control (step S1). If the output current value exceeds 105% of the rated current but does not exceed 110% of the rated current (step S8), the operation proceeds to step S10 where the degree of opening of the inlet vane 35 is prohibited from being increased from the current state in order to limit an increase in the output of the turbo chiller 1. In this manner, the output of the turbo chiller 1 can be limited on the basis of the output current value even when the integrated value S does not exceed the load limit threshold St.

The operation then proceeds to step S11. If the integrated value S exceeds the load limit threshold St, the operation proceeds to step S6 where the inlet vane 35 is forcedly closed in order to forcedly reduce the output of the turbo chiller 1. If it is determined in step S11 that the integrated value does not exceed the load limit threshold St, the operation returns to step S7 where the output current value is monitored again.

If it is determined in step S8 that the output current value exceeds 110% of the rated current (second threshold), the operation proceeds to step S9 where the inlet vane 35 is forcedly closed in order to forcedly reduce the output of the turbo chiller 1. In this manner, the output of the turbo chiller 1 can be reduced on the basis of the output current value even when the integrated value S does not exceed the load limit threshold St.

As described above, the present embodiment provides the following advantages.

The calculation result obtained by the protective function of the inverter control portion 3a is estimated at the inverter-protective-function estimating unit provided in the control device 1a of the turbo chiller 1, whereby a stoppage by the protective function of the inverter device 3 can be predicted. Accordingly, the inverter device 3 can be stopped on the basis of the inverter control portion 3a's own determination regardless of the condition of the turbo chiller 1 ascertained by the control device 1a of the turbo chiller 1. In consequence, the control device 1a of the turbo chiller 1 can avoid unexpected stoppages.

Furthermore, the load limit threshold St is provided, and when this value is exceeded, the output of the turbo chiller 1 is limited or reduced since the integrated value S can be expected to approach the corresponding upper limit Ssd. Accordingly, by allowing the output current to be preferably lower than or equal to the polarity-determining value to reduce the integrated value, the timing at which the turbo chiller 1 ends up being stopped due to the integrated value reaching the upper limit can be delayed, thereby extending the stable operating time of the turbo chiller 1 as much as possible.

Furthermore, since the corresponding upper limit Ssd used in the control device 1a of the turbo chiller 1 is set to a value that is smaller than the upper limit used in the inverter control portion 3a, a stopping operation of the turbo chiller 1 is performed prior to a stopping operation of the inverter device 3, thereby achieving a stable stopping operation according to the predetermined sequence at the turbo chiller side.

Furthermore, since the output limitation or the output reduction of the turbo chiller 1 based on the output current value of the inverter device 3 is performed in addition to or in combination with the control based on the integrated value S, the stable operating time of the turbo chiller 1 can be further extended.

Although a turbo chiller is used as an example of a heat source apparatus to describe the present embodiment, the present invention can be applied to other apparatuses equipped with an electric compressor driven by an inverter device. For example, the present invention can be applied to a screw chiller.

Although an inlet vane is controlled in order to limit or reduce the output of the turbo chiller, the present invention is not limited to this. For example, the output of the chiller and the load on the inverter device may be reduced by opening the hot-gas bypass valve 14, or the output of the chiller and the load on the inverter device may be reduced by reducing the rotation speed of the electric motor 7.

Furthermore, the control device 1a of the turbo chiller 1 may be configured to obtain the integrated value directly from the inverter control portion 3a. In consequence, the estimation in the control device 1a can be omitted.

Furthermore, although the turbo chiller 1 is described as a single chiller in the present embodiment, an actual application may include a heat source system (not shown) with multiple turbo chillers 1 connected thereto in accordance with the thermal demand. In this case, since the system shifts from the single-apparatus operation to the multiple-apparatus operation as the load increases, a pre-activated turbo chiller 1 always requires a large load. Thus, the inverter device 3 and the electric motor 7 tend to become overloaded. In that case, the protective function of the inverter device 3 may be ascertained by the turbo chiller side so that a preceding trip state of the inverter device 3 can be avoided by the inverter control portion 3a, thereby advantageously extending the stable operating time.

Furthermore, although a turbo chiller that performs a refrigerating operation is used to describe the present embodiment, the present invention may be applied to a heat-pump turbo chiller that can also perform a heat-pump operation.

The invention claimed is:

1. A heat source apparatus comprising:
an electric compressor that is driven by an inverter device and that compresses a refrigerant, the inverter device having a protective function that performs stoppage for device protection on the basis of a predetermined calculation by an inverter control portion;
a condenser that condenses the refrigerant compressed by the electric compressor;
an expansion valve that expands the refrigerant condensed by the condenser;
an evaporator that evaporates the refrigerant expanded by the expansion valve; and
a control device that controls at least one of cold output and heat output,
wherein the control device includes an inverter-protective-function estimating unit that estimates a calculation result of the protective function of the inverter control portion;
wherein the inverter-protective-function estimating unit calculates the predetermined calculation, which is performed in the inverter control portion, in a parallel fashion in the control device; and
wherein the control device communicates with the inverter control portion and provides the inverter control portion with an instruction to control the electric compressor.

2. The heat source apparatus according to claim 1, wherein when the inverter-protective-function estimating unit determines that a stopping operation by the protective function of the inverter control portion is imminent, the control device performs control so as to reduce a load on the inverter device.

3. The heat source apparatus according to claim 2, wherein the load on the inverter device is reduced by performing capacity control of the heat source apparatus.

4. The heat source apparatus according to claim 3, wherein an inverter stopping condition is determined to occur when an integrated value of the predetermined calculation by the protective function of the inverter control portion reaches an upper limit, the predetermined calculation including addition when an output current output from the inverter device to the electric compressor exceeds a polarity-determining value and subtraction when the output current falls below the polarity-determining value, and
wherein the inverter-protective-function estimating unit obtains the output current value and the polarity-determining value from the inverter device to perform the addition and the subtraction.

5. The heat source apparatus according to claim 2, wherein an inverter stopping condition is determined to occur when an integrated value of the predetermined calculation by the protective function of the inverter control portion reaches an upper limit, the predetermined calculation including addition when an output current output from the inverter device to the electric compressor exceeds a polarity-determining value and subtraction when the output current falls below the polarity-determining value, and
wherein the inverter-protective-function estimating unit obtains the output current value and the polarity-determining value from the inverter device to perform the addition and the subtraction.

6. The heat source apparatus according to claim 1, wherein an inverter stopping condition is determined to occur when an integrated value of the predetermined calculation by the protective function of the inverter control portion reaches an upper limit, the predetermined calculation including addition when an output current output from the inverter device to the electric compressor exceeds a polarity-determining value and subtraction when the output current falls below the polarity-determining value, and
wherein the inverter-protective-function estimating unit obtains the output current value and the polarity-determining value from the inverter device to perform the addition and the subtraction.

7. The heat source apparatus according to claim 4, wherein the inverter-protective-function estimating unit has a load limit threshold with which the load on the inverter device is limited by controlling the heat source apparatus using the control device before the integrated value reaches a corresponding upper limit that corresponds to the upper limit of the inverter device.

8. The heat source apparatus according to claim 7, wherein the inverter-protective-function estimating unit has a forced limit value with which a performance of the heat source apparatus is forcedly reduced, the forced limit value being between the load limit threshold and the corresponding upper limit.

9. The heat source apparatus according to claim 7, wherein the corresponding upper limit is a value that is smaller than the upper limit of the inverter device, and wherein a stopping operation of the heat source apparatus is performed when the corresponding upper limit is reached.

10. The heat source apparatus according to claim 1, wherein when an output current value of the inverter device that drives the electric compressor exceeds a first threshold, the control device controls the heat source apparatus so as to limit a load on the inverter device.

11. The heat source apparatus according to claim 10, wherein when the output current value exceeds a second threshold that is greater than the first threshold, the control device forcedly reduces a performance of the heat source apparatus.

12. The heat source apparatus according to claim 1, wherein the inverter-protective-function estimating unit obtains the calculation result of the protective function from the inverter control portion.

13. A heat source system comprising:
an inverter device having a protective function that performs stoppage for device protection on the basis of a predetermined calculation by an inverter control portion; and
a plurality of heat source apparatuses,
wherein each heat source apparatus includes
an electric compressor that is driven by the inverter device and that compresses a refrigerant,
a condenser that condenses the refrigerant compressed by the electric compressor,
an expansion valve that expands the refrigerant condensed by the condenser,
an evaporator that evaporates the refrigerant expanded by the expansion valve, and
a control device that controls at least one of cold output and heat output, and
wherein the control device includes an inverter-protective-function estimating unit that estimates a calculation result of the protective function of the inverter control portion;
wherein the inverter-protective-function estimating unit calculates the predetermined calculation, which is performed in the inverter control portion, in a parallel fashion in the control device; and
wherein the control device communicates with the inverter control portion and provides the inverter control portion with an instruction to control the electric compressor.

14. A method for operating a heat source apparatus that includes
an electric compressor that is driven by an inverter device and that compresses a refrigerant, the inverter device having a protective function that performs stoppage for device protection on the basis of a predetermined calculation by an inverter control portion,
a condenser that condenses the refrigerant compressed by the electric compressor,
an expansion valve that expands the refrigerant condensed by the condenser,
an evaporator that evaporates the refrigerant expanded by the expansion valve, and
a control device that controls at least one of cold output and heat output,
the method comprising:
estimating a calculation result of the protective function of the inverter control portion by using the control device;
calculating the predetermined calculation, which is performed in the inverter control portion, in a parallel fashion in the control device;
communicating with the inverter control portion by the control device; and
providing the inverter control portion with an instruction to control the electric compressor by the control device.

15. The method for operating the heat source apparatus according to claim 14, wherein an inverter stopping condition is determined to occur when an integrated value of the predetermined calculation by the protective function of the inverter control portion reaches an upper limit, the predetermined calculation including addition when an output current output from the inverter device to the electric compressor exceeds a polarity-determining value and subtraction when the output current falls below the polarity-determining value, and
wherein the estimating the calculation result includes obtaining the output current value and the polarity-determining value from the inverter device to perform the addition and the subtraction.

* * * * *